July 11, 1950
W. A. AYRES
2,514,828
SYNTHESIZED STEREOSCOPIC VISION
Filed Sept. 12, 1942
2 Sheets-Sheet 1
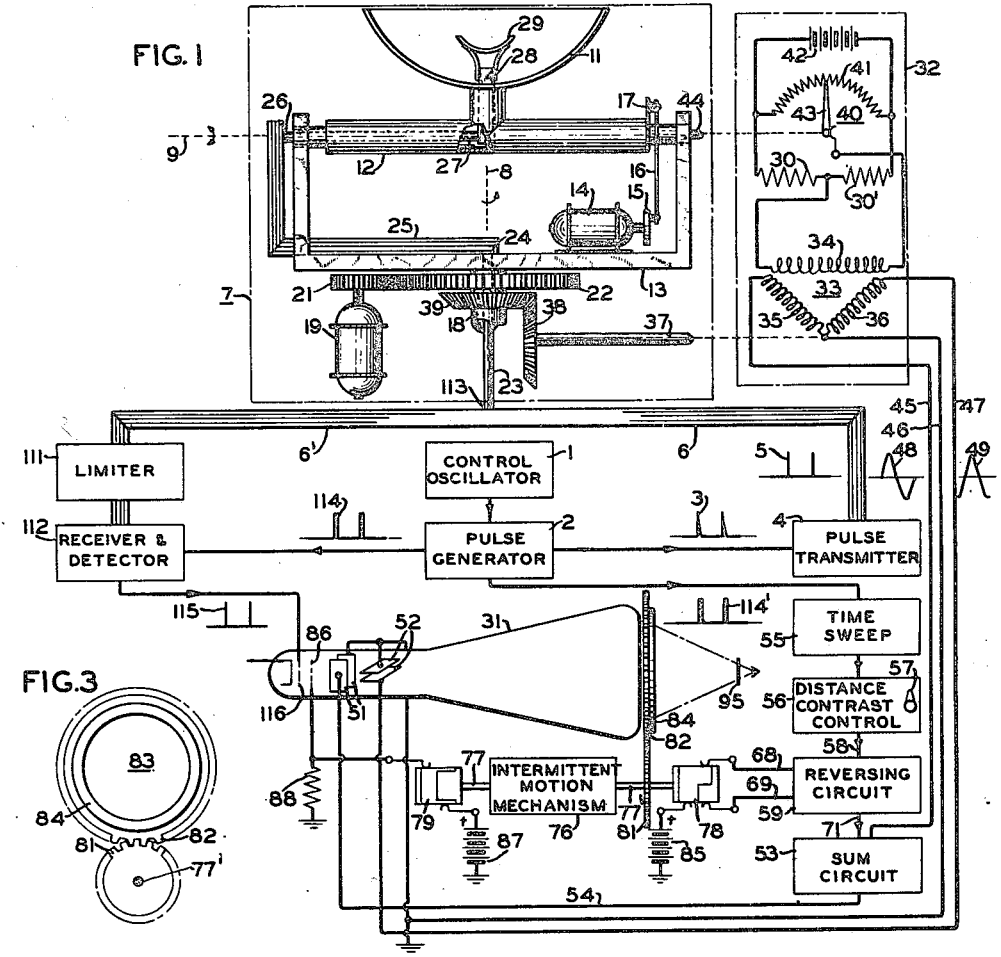
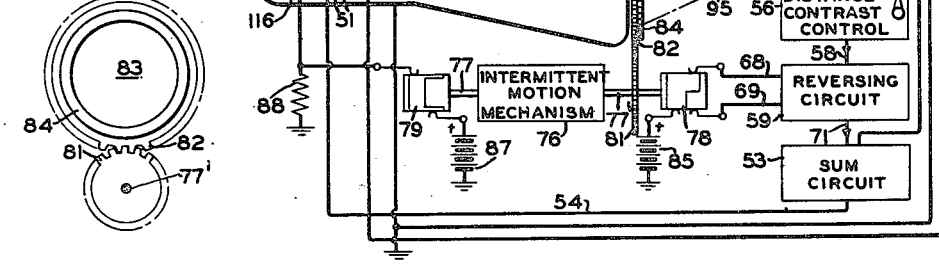
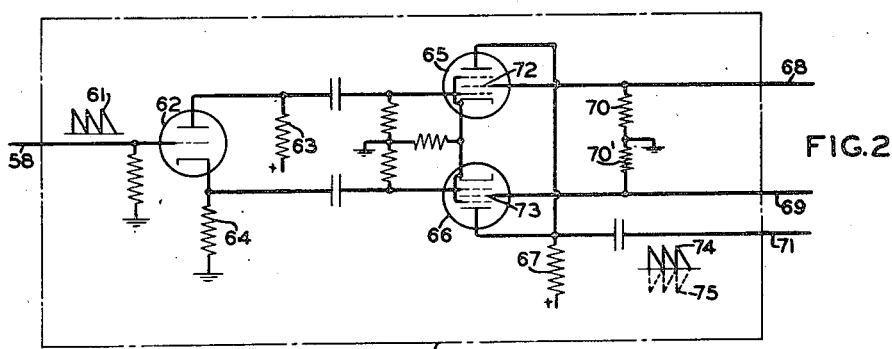
INVENTOR
W. A. AYRES
BY
ATTORNEY July 11, 1950 W. A. AYRES 2,514,828
SYNTHESIZED STEREOSCOPIC VISION
Filed Sept. 12, 1942 2 Sheets-Sheet 2
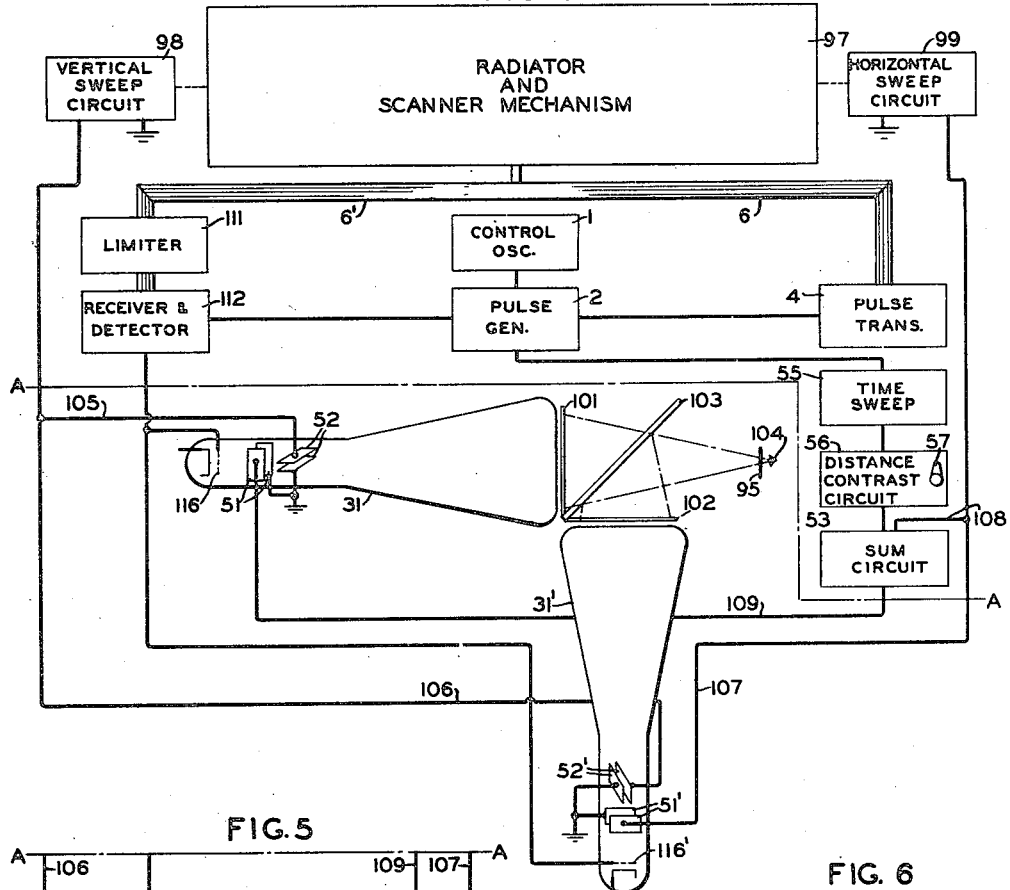
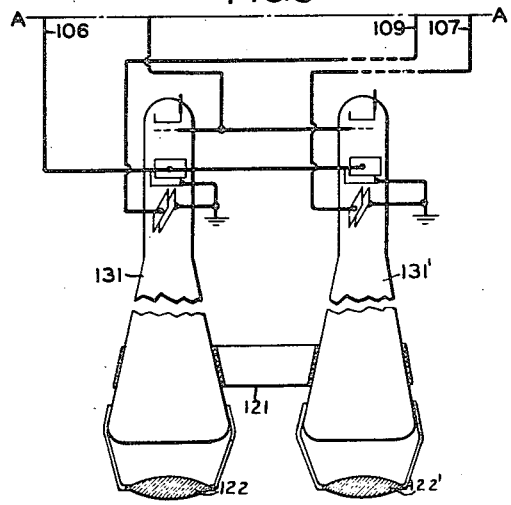
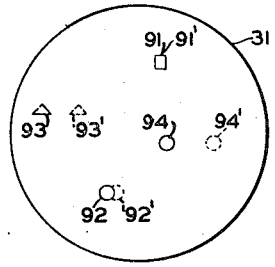
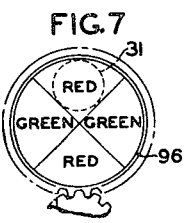
INVENTOR
W. A. AYRES
BY Paul B. Hunter
ATTORNEY Patented July 11, 1950

2,514,828

UNITED STATES PATENT OFFICE 2,514,828

SYNTHESIZED STEREOSCOPIC VISION

Waldemar A. Ayres, Kew Gardens Hills, N. Y., assignor to The Sperry Corporation, a corporation of Delaware Application September 12, 1942, Serial No. 458,109

23 Claims. (Cl. 343—11)

This invention relates, generally, to the art of stereoscopy and, more particularly, to means for producing a three-dimensional picture of remote objects, said picture being synthesized from the positional data obtainable by a microwave object detecting and locating system employing a single electromagnetic energy collector.

In prior art stereoscopy two views are always required to provide depth perception. The well-known binocular is an example of two viewpoints coupled by an optical system. Here, not only is the perception of depth or distance contrast severely limited by physical considerations, but it is predetermined by the mechanical design. Prior art optical systems using a long base line, such as that employed by reconnaissance aircraft to obtain a stereoscopic effect, do not provide an instantaneous and continuous three-dimensional picture. Aerial photographs thus obtained must be developed and viewed upon the return from the flight. Furthermore, visibility conditions restrict the usefulness of all prior art stereoscopy.

Ultra high frequency radio object detection and location systems have been developed which provide positional data about objects scanned as disclosed in copending application Serial No. 406,494 filed August 12, 1941, in the names of Lyman et al. This information, however, is presented on a pair of indicator patterns, one placing images according to the azimuth and elevation of the corresponding objects and the other positioning images according to their range and either of the directional coordinates. The observer must attempt to correlate two entirely different patterns simultaneously in order to grasp the positional relationships of a plurality of objects. This procedure is quite foreign to visual experience. Not only is the range information revealed in a graphical form having no physical analogue, but there is also ambiguity between objects having similar values of the directional co-ordinate employed with the range scale.

It is, therefore, one of the objects of the present invention to provide a novel ultra high frequency radio scanning and distance measuring system adapted to instantaneously and continuously produce a three-dimensional picture of objects in any desired scanning area regardless of visibility conditions.

Another object of the present invention lies in the provision of a novel method and means for ultra high frequency radio terrain mapping, obstacle detection, aircraft traffic control and the like, which produce a three-dimensional picture or stereoscopic view of the scanned area.

Yet another object is to provide a stereoscopic picture on a cathode ray indicator wherein the effective interocular distance may be electrically controlled thereby altering the range contrast at will.

A further object is to provide ultra high frequency radio means for obtaining three-dimensional images of remote objects from a single viewpoint without resort to a physical base line.

A still further object lies in the provision of means for creating a picture on an indicator as of the cathode ray type, the image elements of which are transversely shifted in relation to the range to the corresponding elemental objects.

Another object is to provide electrical time sweep means which alters the perception of depth relationship on a cathode ray indicator according to any desired function of distance.

Still another object lies in the provision of indicator means and associated sweep circuits whereby the relative magnitudes of electrical quantities may be expressed in terms of their relative ability to create a stereoscopic impression of distance.

Yet a further object lies in the provision of electrically controlled indicator means wherein abstract three-dimensional images may be created with the aid of suitable electrical quantities without reference to any corresponding physical objects.

Another object lies in the provision of a microwave object detecting and locating system having cathode ray indicator means wherein the bearings of remote objects are revealed by dual images, the images corresponding to any particular object being separated by a voltage varied in relation to the range to that object, and optical filter means for limiting the vision of an observer's eyes to single images in order to create a stereoscopic effect.

Other objects and advantages will become apparent from the specification, taken in connection with the accompanying drawings wherein the invention is embodied in concrete form.

In the drawings,

Fig. 1 is a partially schematic block diagram of a system for providing synthesized stereoscopy.

Fig. 2 is a wiring diagram of a portion of the structure of Fig. 1.

Fig. 3 is a front view of the optically polarizing screen employed in Fig. 1.

Fig. 4 illustrates a modification of Fig. 1 employing two indicators.

Fig. 5 shows alternate indicating means which may be substituted for that portion of Fig. 4 defined by dashed line A—A.

Fig. 6 illustrates idealized patterns on the face of an indicator.

Fig. 7 shows a color filter through which the indicator employed in Fig. 1 may be viewed.

Similar characters of reference are used in all of the above figures to indicate corresponding parts.

The fundamental property of stereoscopy, or simultaneous vision with both eyes, is the direct perception of relative distances of objects. The fact that the same object forms slightly dissimilar images on the two retinas due to the separation of the eyes enables the brain to construct a mental picture of the scene in three dimensions. Although the complete analysis of stereoscopic vision involves many little understood psychological effects, the necessary conditions for stereoscopy external to the eyes of the observer may be discussed from purely geometric considerations.

For example, a stereoscopic effect may be produced by obtaining two photographs of the same scene from viewpoints laterally spaced some distance apart. The observer looks at one picture with the left eye only and at the other picture solely with the right eye. An optical system is usually employed to facilitate this operation.

Upon analysis the present inventor has observed that the dissimilarity which re-creates three dimensions from the two-dimensional pictures is basically due to the fact that objects appearing in the plane of the paper or indicating surface have the same relative positions in each of the two pictures whereas objects in front of and behind this plane are displaced laterally with respect to the positions these objects would assume were they in this plane. Objects appearing behind the plane of the indicating surface are displaced toward the right in the picture seen by the right eye and toward the left in the picture seen by the left eye. Conversely, the objects appearing in front of the plane of the indicating surface are displaced toward the left in the picture seen by the right eye and toward the right in the picture seen by the left eye. This displacement is proportional to the distance of objects from the plane of the indicating surface. If the spacing between the two viewpoints from which the photographs are taken is equal to the normal interocular distance the resultant three-dimensional effect is entirely realistic. However, since the close spacing of the eyes limits the stereoscopic vision of a normal sighted person to a few hundred yards, it is desirable for many purposes to increase the perception of depth by increasing the effective interocular distance.

The exemplified embodiment of the present invention discloses a microwave object detecting and locating system providing, cathode ray indicator means wherein the bearings of remote objects are revealed by coincident images on two patterns, means for so applying a voltage corresponding to the range of the objects, to the lateral electron beam deflecting electrodes of the indicator means that the previously superimposed images are separated according to the analysis of the previous paragraph, and means for limiting the response of the separate eyes of an observer to separate patterns in order that the dual images may be fused in the brain of the observer, thus creating a sense of depth.

Referring now to Fig. 1, the present invention is disclosed as employed in a reflected-pulse type of ultra high frequency system. In the system illustrated, a control oscillator 1 of any well-known type provides a voltage of suitable synchronizing and control frequency which may be in the audio range. The output of oscillator 1 is connected to a pulse generator 2 which converts the substantially sinusoidal oscillations fed to it into pulses of any desired shape, magnitude and duration, having a repetition rate equal to the frequency of oscillator 1. This device employs well-known clipping, differentiating, and other suitable wave shaping circuits in the conventional manner and consequently seems to require no further explanation.

Trigger pulses, shown at 3 reduced to unity magnitude and idealized in wave shape, are supplied to a pulse transmitter 4. These trigger pulses cause an ultra high frequency oscillator, which may be a magnetron, to be biased on momentarily. Transmitter 4 is thus caused to produce extremely short pulses of perhaps one micro-second duration, as indicated at 5. These pulses of carrier frequency are fed through a rectangular wave guide 6 to a scanning radiator 7.

The radiator 7 may be of the general type shown in copending application Serial No. 438,388, filed April 10, 1942 which issued Nov. 12, 1946 as Patent No. 2,410,831, in the names of L. A. Maybarduk et al. Such a radiating device is adapted to scan a predetermined conical angle up to and including a complete hemisphere by means of a spiral conical motion of a sharply directed radiant energy beam. This motion is provided by rapidly spinning the radiating system about an axis 8 while slowly nodding the system about a second axis 9 perpendicular to and rotating with the first axis.

Scanning radiator 7 is shown in simplified form to clarify the basic mechanism, but it is to be understood that rectangular, interlaced, or other types of scanning actuated by either mechanical or electronic means may be alternatively employed. A spherical parabolic reflector 11 is attached to the base of a hollow T-shaped member 12 which is pivotally mounted between the arms of a yoke 13. A motor 14, mounted on the yoke 13, carries a disc 15 on its drive shaft. One end of a crank shaft 16 is eccentrically and rotatably connected to the disc 15 while the other end is similarly connected to a lever arm 17 fastened to member 12 and perpendicular thereto. It is seen that rotation of motor 14 may thus be made to cause a suitable oscillating or nodding motion of the reflector 11 about the nod axis 9. The yoke 13 is secured to a hollow column 18 which is in turn rotatably supported about the spin axis 8 by a base (not shown). A stationary motor 19 provides rotation for the yoke 13 by means of its drive pinion 21 and a ring gear 22 mounted on the column 18. The motor 14 may, of course, be eliminated and power supplied for the nodding motion by the motor 19 through suitable gearing.

The rectangular wave guide 6 is connected to a cylindrical wave guide 23 which enters the scanner system by passing concentrically through the hollow column 18. A rotatable joint indicated at 24 connects the cylindrical wave guide 23 to another rectangular wave guide 25 fastened to the yoke 13. The guide 25 projects through an arm of the yoke and extends upward to the nod axis 9. A second rotatable joint, indicated at 26, connects the wave guide 25 to a further cylindrical wave guide 27 supported concentrically within the T-shaped member 12. A final section of rectangular wave guide 28, attached to the end of guide 27, lies on the principal axis of the reflector 11 and is adapted to interchange energy therewith by means of a deflecting plate 29.

Suitable low loss rotatable wave guide joints and means for bilateral conversion from electromagnetic wave propagation in rectangular wave guides to propagation in cylindrical guides have been fully disclosed in copending application Serial No. 447,524, filed June 18, 1942, which issued as Patent No. 2,407,318 on Sept. 10, 1946, in the names of W. W. Miehr, et al.

The transmitter pulses 5 are emitted in a narrow club-shaped beam from the radiator 7 at a pulsing frequency sufficiently high to insure that all objects within the field of view are irradiated during the scanning cycle. Radiator 7 serves also to receive energy reflected from remote objects during the intervals between successive transmission periods. The received energy passes in reverse direction through the wave guides associated with the radiator 7. A wave guide 6' connecting with the wave guide 23 conducts the received energy through a limiter 111 to a receiver and detector 112.

The limiter 111 prevents the high power transmitted pulses from affecting the receiver while allowing the relatively weak received energy to pass through with little attenuation. This limiter may be of the gaseous discharge type, known to the art, which consists of a gas filled resonant chamber containing electrodes and maintained close to the ionization point. The limiter is adapted to discharge when strongly excited and thus effectively damps the exciting oscillations. The electrical length of the wave guide 6' is adjusted to reflect a very high impedance at the junction 113 with transmitter guide 6 when the transmitted pulses, upon attempting to pass through the limiter, discharge the resonant chamber and create substantially a short circuit therein. The receiver 112 amplifies and detects the received pulses in the usual manner and applies them to a control grid 116 of the cathode ray indicator 31. To further insure that no transmitted pulses directly affect the receiver, blanking pulses, shown at 114, may be furnished from the pulse generator 2 in order to bias the receiver to insensitivity for the duration of the transmitted pulses. The detected pulses, shown at 115 reduced to unity magnitude and idealized in shape, are of course delayed behind their respective transmitted pulses by the time required for radiant energy to travel to the point of reflection and return.

A sweep circuit 32, mechanically connected to the radiator 7, is adapted to convert the spiral scanning motion of the latter into corresponding beam deflecting potentials for the cathode ray oscilloscope 31. The sweep circuit 32 comprises a two-phase generator 33 having a field winding 34 and motor windings 35 and 36 spaced 90° with respect to each other. The rotor windings are driven synchronously with the spin motion of radiator 7 by means of a rotor shaft 37 having a bevel gear 38 attached thereto which meshes with a similar gear 39 mounted on the column 18. The field winding 34 is energized by the variable output of a bridge circuit 40 which latter is formed by the series combination of equal fixed resistors 30 and 30' in parallel with a potentiometer 41. The bridge circuit 40 has a direct voltage from a source 42 applied across it, while the winding 34 is connected between the junction of resistors 30, 30' and the sliding contact 43 of the potentiometer 41. The contact 43 is oscillated synchronously with the nodding motion of the radiator 7 by means of a connecting shaft 44 extending from the T-shaped member 12 along the nod axis 9. The output of the bridge 40 varies from zero when the principal axis of the reflector 11 is parallel to the spin axis 8 to predetermined positive and negative values corresponding to the maximum nod angles in opposite directions. A lead 46 is connected to the common junction of windings 35 and 36 while leads 45 and 47 connect to the other ends of windings 35 and 36, respectively.

The sinusoidal voltages indicated at 48 and 49 generated in windings 35 and 36, have a frequency equal to the rate of spin and amplitude directly proportional to the nodding motion. These voltages are in phase quadrature due to the spatial relationship of the windings 35 and 36. The lead 46 is connected to one side of horizontal and vertical deflecting plates 51 and 52, respectively. Lead 47 runs to the other vertical deflecting plate, while lead 45 supplies one input of a unity gain sum circuit 53 which may comprise two electron tubes having a common plate load. A lead 54 from the output of the sum circuit 53 is attached to the other horizontal deflecting plate. Regarding, for the moment, the sum circuit 53 merely as a unilateral coupling between leads 45 and 54, it is seen that the voltages applied to the deflecting plates 51 and 52 would cause the electron beam, if it were on, to scan spirally in a manner corresponding to the motion of the radiator 7.

The system thus far described is entirely conventional and may be employed to indicate the azimuths and elevations of the objects scanned. It is the novel use of the range measurement obtainable from a reflected pulse type system which enables the cathode ray indicator to provide a stereoscopic picture.

The pulse generator 2 supplies pulses shown at 114', coincident with the trigger pulses, to a time sweep circuit 55. This circuit may be a conventional saw-toothed wave generator in which the applied pulses overcome the grid bias on a tube whose cathode is isolated from ground by a condenser. When the tube conducts, the condenser is charged. A pentode acting as a constant current device shunts the condenser so that at the termination of the applied pulse the charge may leak to ground at a substantially linear discharge rate. The output of the time sweep circuit 55 is applied to a distance contrast control circuit 56 which may be a variable gain amplifier or an attenuator. The amplitude of the time sweep is adjustable by a control knob 57. The device 56 supplies the input lead 58 of a reversing circuit 59, a possible arrangement of which is shown in Fig. 2.

The reversing circuit 59, schematically illustrated in Fig. 2, has saw-tooth waves, shown at 61, applied to the grid of a tube 62 through the input lead 58. Tube 62 has equal plate and cathode resistors 63 and 64, respectively. The voltage wave produced across resistor 63 is, therefore, the exact reverse of that created across resistor 64. Resistors 63 and 64 are resistance-capacity coupled to the control grids of similar pentodes 65 and 66, respectively. Tubes 65 and 66 have a common load resistor 67 which is connected by a lead 71 to the second input of the sum circuit 53. The tubes 65 and 66 may be made alternatively operative by alternately supplying screen grid potentials to grids 72 and 73, respectively, over leads 68 and 69, respectively. Resistors 70 and 70' connect grids 72 and 73 to ground and prevent these electrodes from accumulating space charge. When tube 65 is conducting the output voltage is indicated by the solid wave shape 74, while the dashed wave shape 75 illustrates the output voltage when tube 66 is operating. Saw-tooth waves 74 or 75 are added in the sum circuit 53 to the voltage applied to the horizontal deflecting plates 51 of the oscilloscope or cathode ray indicator 31 by sweep circuit 32.

An intermittent motion mechanism 76 has a drive shaft 77, 77' mounting commutators 78 and 79, and a gear 81. Gear 81 engages a ring gear 82 carried on a ring member 84 which latter is supported parallel and concentric with the face of the oscilloscope 31 by suitable roller bearings (not shown). Fig. 3 shows a front view of the ring member 84 which provides a supporting frame for a polarizing screen 83 held before the face of oscilloscope 31. The screen 83 may be made of a commercially available transparent sheet adapted to plane polarize the light it transmits. The oscilloscopic picture as viewed through screen 83 is, therefore, optically polarized in a plane corresponding to the angle of rotation of this screen about the line of sight. The intermittent motion mechanism 76, which may contain a solenoid or a Geneva movement, is adapted to rotate or oscillate tthe screen 83 by means of gearing 81, 82 in 90° jumps. The plane of polarization may, for example, be either vertical or horizontal for the major portion of the time, passing through intermediate angles very rapidly. Commutator 78 is designed to connect screen grid leads 68 and 69 in succession to a voltage source 85 when the polarizing screen 83 is alternately, say, vertical and horizontal, respectively. The commutator 79 is designed to connect the first anode 86 of the oscilloscope 31 to a voltage source 87 only near the momentarily stationary positions of the screen 83. Resistor 88, attached between anode 86 and ground, discharges space charge currents when the anode is disconnected from the voltage source 87. The electron beam of the oscilloscope 31 is thus cut off by the action of commutator 79 during the periods in which there is any appreciable motion of the screen 83.

The operation of Fig. 1 is described with reference to Fig. 6 which represents idealized patterns on the face of oscilloscope 31 as viewed with the naked eye. The picture reveals the presence of four objects represented by dual images 91, 91', 92, 92', 93, 93', and 94, 94'. When the polarizing screen 83 is momentarily in, say, the vertical polarizing position, the radiator 7 scans the viewing area and picks up energy reflected from the four objects. The received pulses, applied to the oscilloscope control grid 116, turn the electron beam on after a time delay behind their respective transmitted pulses that is proportional to the distance from the apparatus to the reflecting object. The potentials on the horizontal and vertical beam deflecting electrodes 51 and 52, respectively, position the beam substantially according to the bearing to the object. However, added to the normal azimuth positioning voltage is the saw-tooth voltage generated by time sweep circuit 55, adjusted to a desired amplitude by distance contrast circuit 56, and given the desired polarity in reversing circuit 59. This time sweep voltage is abruptly raised to a maximum value upon transmission of each ultra high frequency pulse, decreasing at a substantially linear rate to zero before the next transmitted pulse. It seems evident that nearby objects, providing reflected pulses having a small time delay, turn the electron beam on when the saw-tooth voltage is relatively large, resulting in a relatively large shift of the image from the normal azimuth position. Conversely, the reflected energy from a remote object lags the transmitted pulse by a long time and therefore turns the electron beam on when the saw-tooth voltage is relatively small, resulting in a correspondingly slight shift of the image from the normal azimuth position. When the polarizing screen 83 is momentarily in the horizontal position the radiator 7 scans the viewing area again. The reversing circuit 59 may, for example, supply the time sweep voltage having a polarity such as to shift the electron beam to the left for vertical polarization and to the right for horizontal polarization. Under these conditions solid images 92, 93, and 94 on the left are vertically polarized while dashed images 92', 93', 94' on the right are horizontally polarized. Images 91, 91' represent an object so remote as not to have the electron beam appreciably deflected by the time sweep while the other images represent objects progressively nearer in numerical order. If the pattern is observed through polarizing eyeglasses, indicated at 95 in Fig. 1, the right and left lenses transmitting only vertically and horizontally polarized light, respectively, the observer's right and left eyes respond only to left and right shifted images, respectively. The dual images are fused in the brain of the observer and provide a stereoscopic picture. The three-dimensional spatial relationships are instantaneously comprehended from normal visual experience. The depth of perception may be adjusted by means of the knob 57 on the distance contrast control circuit 56 so that even the range relationship between remote objects may be easily determined. The effective interocular distance is thus simply altered by varying the amplitude of the time sweep voltage. According to the above operation, all objects appear in front of the screen of the oscilloscope 31. If desired, however, the time sweep voltage may be reversed with respect to the two planes of polarization thus causing all objects to seem to lie behind the oscilloscope screen. Also, an intermediate position of the indicating surface may be had wherein objects in the foreground lie in front of the plane of the indicating surface while objects in the background lie to the rear of this plane. This is achieved by adjusting the time axis of the saw-tooth wave to provide an alternating voltage rather than a pulsating direct voltage.

The structure of Fig. 1 is subject to many modifications. It is to be understood that the time sweep voltage need not be a saw-tooth wave having an amplitude linear with respect to range but may be a sinusoidal, exponential, or other function of time if the distortion of depth relationships is immaterial or desired. It is also not necessary to employ the time sweep in creating the pattern for both eyes. The necessary dual images may be obtained by alternating between images as normally positioned by the scanner potentials and images as displaced in one direction from the normal position by the time sweep. The polarization of the optical images need not be horizontal and vertical, the conditions used in the operational explanation, but must merely have a substantially quadrature relationship. Since it is only desired to convey the appropriate patterns to the corresponding eyes, alternative optical filter means may be employed. For example, Fig. 7 illustrates a screen 96 comprising red and green sectors which may be utilized in place of screen 83. The face of the oscilloscope 31 is alternately viewed through the complementary color filters by an observer wearing correspondingly colored glasses. Thus each eye sees only the single pattern intended for it. Dual indicators may be preferable under certain circumstances since their employment obviates the intermittent motion mechanism 76 and associated circuits and permits the use of relatively long persistence images.

Referring now to Fig. 4, there is illustrated a modification of Fig. 1 having two indicators 31 and 31', one for each eye. Indicator 31 has an optically polarizing screen 101 placed in front of it while indicator 31', spaced 90° away from indicator 31 in a common plane, has a screen 102 placed before it, similar to screen 101 but polarized substantially at right angles thereto. A semitransparent mirror 103 bisects the angle between the two devices so that conventional two-dimensional patterns may be exactly superimposed as seen from a viewpoint 104. A radiator and scanner mechanism 97 may scan rectangularly rather than spirally as does radiator 7 shown in Fig. 1 and actuate vertical and horizontal sweep circuits 98 and 99, respectively. The vertical sweep circuit 98 is connected by leads 105 and 106 to vertical deflecting plates 52 and 52' of indicators 31 and 31', respectively. The horizontal sweep circuit 99 is connected by a lead 107 to the horizontal deflecting plates 51' of indicator 31' and by a lead 108 to one input of the sum circuit 53. The second input of the sum circuit 53 is supplied directly from the distance contrast control circuit 56. The output lead 109 of the sum circuit 53 runs to the horizontal deflecting plates 51 of indicator 31.

The operation of Fig. 4 differs from that of Fig. 1 in that there are no mechanically moving parts. The pattern on the indicator 31' is a conventional two-dimensional representation of the scanned area while the pattern on the indicator 31 reveals the images shifted laterally according to a function of the distance to the corresponding objects. When the two pictures are viewed through the polarizing glasses 95, each eye responding only to the desired pattern, the slight separation of the images intended for the different eyes causes the three-dimensional effect. Again as in Fig. 1 the polarizing screens and glasses may be replaced by appropriate color filters. A binocular indicator illlustrated in Fig. 5 may be substituted for the apparatus in Fig. 4 below the dashed line A—A.

In Fig. 5 two cathode ray tubes 131 and 131', held together by a framework 121 may be of easily portable dimensions while an optical system indicated at 122 and 122' permits direct observation of tubes 131 and 131' by the left and right eyes, respectively. This type of indication eliminates the necessity for wearing glasses. The means for viewing the dual images once correctly formed is incidental to the practicing of the present invention, and, therefore, the disclosed means are merely illustrative and are not intended to be limiting. The apparatus of Fig. 5 may be made light and portable, having somewhat the dimensions of ordinary binoculars, and the leads 106 to 109 may be flexible cables with plugs so that the same may be plugged into conveniently located sockets at different locations on the craft using this equipment.

The essence of the present invention must not be obscured by the fact that the exemplified embodiment coacts with an ultra high frequency system. Although means have been disclosed for comparing physical objects as to azimuth, elevation, and range, any functions of three independent variables, expressible in electrical form, may be similarly compared.

As many changes could be made in the above construction any many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for reproducing a field of view comprising means for radiating ultra high frequency electromagnetic energy and for receiving such energy as is reflected from objects in said field of view, means coupled with said radiating means for determining the bearing and range of an object in said field of view, an indicator controlled from said second means for indicating the bearing of said object, said second means supplying a suitable control potential to said indicator for causing the bearing indication thereof to be responsive to the range of the object scanned, and means for viewing the bearing indication of the object to produce a sense of depth.

2. A microwave object detecting and locating system comprising, means for irradiating remote objects with electromagnetic energy and for receiving energy reflected from the objects, means for measuring the range of the objects scanned, indicator means actuated by said first means for revealing the bearings of an object by similar images, said range measuring means serving to relatively displace the images according to a desired function of the range of the object, and means for limiting the response of the separate eyes of an observer to separate images whereby the images are fused in the brain of the observer to provide a sense of depth.

3. A microwave object detecting and locating system comprising, means for irradiating remote objects with electromagnetic energy, means for directionally receiving energy reflected from the objects, means for measuring the range of the objects scanned, cathode ray indicator means actuated by said directionally receiving means, revealing the bearings of an object by similar images, said range measuring means serving to apply a lateral deflection to the electron beam of said indicator means according to the range of the object to modify the directional indication thereof, and means for limiting the response of the separate eyes of an observer to separate images whereby the images are fused in the brain of the observer to provide a sense of depth.

4. A microwave object detecting and locating system comprising, means for scanning remote objects with electromagnetic energy, means for receiving energy reflected from the objects, means for measuring the range of the objects scanned, cathode ray indicator means actuated by said receiving means for revealing the bearings of an object by similar images, said range measuring means serving to apply a lateral deflection to the electron beam of said indicator means to modify the directional indication according to a desired function of the range of the object, and means for limiting the response of the separate eyes of an observer to separate images whereby the images are fused in the brain of the observer to provide a sense of depth.

5. Means for producing a stereoscopic picture comprising, means for irradiating remote objects with pulses of ultra high frequency electromagnetic energy, means for receiving energy reflected from an object, timing means for measuring the range of the object irradiated in terms of the intervals between the radiation of pulses and the reception of reflected energy due to the pulses, indicator means actuated by said receiving means and said timing means for creating an indication of the object according to the direction and time delay of the reflected energy, the indication comprising dual images that are displaced transversely from true bearing position in accordance with the range to the object, and means for viewing one image with one eye and the other image with the opposite eye, thus producing a perception of depth.

6. In a system of the character described, means for generating ultra high frequency electromagnetic energy in pulses, a directional antenna connected to said generating means, means for causing said directional antenna to scan a field of view while radiating said pulses, a receiver supplied from said directional antenna, a cathode ray indicator, means controlled from said scanning means for supplying scanning potentials to said cathode ray indicator, means for supplying a reversing polarity bias potential to said cathode ray indicator for altering the scanning potentials by a desired function of time, said receiver serving upon receipt of reflected energy from a remote object to effect an indication on the face of the cathode ray indicator showing the angular position of the remote object as transversely shifted by the bias potential, and means for viewing said cathode ray indicator with opposite eyes when the bias potential has opposite polarities thus creating a stereoscopic effect.

7. Means for producing a stereoscopic picture comprising, means for intermittently producing high frequency electromagnetic energy, antenna means for radiating said electromagnetic energy into space while scanning a field of view, said antenna means serving to receive energy reflected from remote objects during intervals between successive transmission periods, indicator means, means for supplying scanning potentials to said indicator means synchronously with the scanning operation of said antenna means, means for intermittently supplying a time sweep potential to said indicator means, a receiver fed from said antenna means and connected to said indicator means for causing the same to indicate the bearings of remote objects as intermittently modified by the time sweep upon the receipt of such transmitted energy as is reflected therefrom, and means for viewing the modified bearings with one eye and the unmodified bearings with the opposite eye.

8. Means for producing a stereoscopic picture comprising, means for intermittently producing high frequency electromagnetic energy, antenna means for directly radiating said electromagnetic energy into space while scanning a field of view, said antenna means serving to receive energy reflected from remote objects during intervals between successive transmission periods, indicator means, means for supplying scanning potentials to said indicator means synchronously with the scanning operation of said antenna means, means for alternately supplying a time sweep potential to said indicator means, a receiver fed from said antenna means and connected to said indicator means for causing the same to indicate the bearings of remote objects as alternately modified by the time sweep upon the receipt of such transmitted energy as is reflected therefrom, and means for alternately viewing the bearing indications with opposite eyes.

9. Means for producing a stereoscopic picture comprising, means for intermittently producing high frequency electromagnetic energy, antenna means for directly radiating said electromagnetic energy into space while scanning a field of view, said antenna means serving to receive energy reflected from remote objects during intervals between successive transmission periods, dual indicator means, means for supplying scanning potentials to said indicator means synchronously with the scanning operation of said antenna means, means for supplying a time sweep potential to one of said indicator means, a receiver fed from said antenna means and connected to said indicator means for causing the same to indicate the bearings of remote objects as modified by the time sweep upon the receipt of such transmitted energy as is reflected therefrom, and means for viewing one indicator means with one eye and the other indicator means with the opposite eye.

10. Apparatus for producing a stereoscopic pattern comprising, means for projecting an indicating beam, deflecting means for causing the beam to sweep over an indicating area, means for varying the beam intensity in response to signals derived from a common electronic source during its sweeping movement to produce a desired visual pattern in the indicating area, means connected to said deflecting means for repeatedly horizontally shifting elements of the visual pattern resulting from said signal pattern by predetermined amounts, and means for viewing the original visual pattern with one eye and the shifted visual pattern with the other eye.

11. Means for producing a stereoscopic pattern comprising, means for projecting two indicating beams, deflecting means for causing the beams to sweep over an indicating area, means for varying the beam intensities to produce a desired visual pattern in the indicating area, means connected to said deflecting means for separating the beams according to a desired function of position, and means for viewing the pattern produced by one beam with one eye and the pattern produced by the other beam with the opposite eye.

12. Means for producing a stereoscopic pattern comprising, means for projecting two indicating beams, dual deflecting means for causing the beams to sweep in like manner over similar indicating areas, means for varying the beam intensities to produce similar visual patterns in the indicating areas, means connected to one of said deflecting means for transversely shifting one beam according to a desired function of position, and means for viewing the similar indicating areas with the separate eyes.

13. Apparatus for producing a stereoscopic image reproduction comprising, means for projecting an indicating beam, means for deflecting said beam in response to the relative positions of objects to be defined in said image reproduction, and means for further deflecting said beam in dependence upon the respective ranges of said objects to produce dual images of each of said objects, said dual images being displaced relative to the actual bearing of said object, and means for viewing one of the images with one eye and the other with the other eye.

14. An apparatus of the character described for producing stereoscopic pictures, comprising radiant energy means having a single radio scanning beam, means for receiving the radio output of said scanning means and for producing stereoscopic images therefrom, and variable control means cooperative with said second-named means for altering the effective interocular distance of said images and hence the depth contrast obtained.

15. In apparatus of the character described, means for directionally propagating radiant energy and for receiving said energy as reflected from remote objects, an indicator, and means responsive to the time of travel of the radiant energy to and from said objects for producing stereoscopic images of said objects on said indicator.

16. In a system of the character described, radio means for obtaining bearings of objects in a field of view, means including means for measuring the range of the objects, indicator means controlled by said first and second means for producing double images for each object separated according to the range thereof, and means for viewing said indicator means such that the double images fuse in the brain of an observer to form a three-dimensional picture, said second-named means including means for varying the lateral positions of elements of said images to thereby vary the depth contrast of objects of said three-dimensional picture.

17. In apparatus for producing a stereograph, the combination comprising means for projecting an indicating beam, beam deflecting means, two-dimensional sweep means operative on said deflecting means for causing said beam to move on an indicating screen according to a prescribed two-dimensional pattern, lateral sweep means operative on said deflecting means synchronously with said two-dimensional sweep means for altering the lateral aspect of said prescribed pattern as a periodic function of time, and means for selectively viewing said screen to form a three-dimensional representation.

18. In radio locator apparatus the combination comprising means for propagating radio waves toward remote objects, means for receiving such radio waves as are returned from said objects in response to waves impinging thereon, an indicator responsive to said receiving means, and means responsive at least in part to the time delays between propagation of waves toward said objects and reception of waves therefrom for producing stereoscopic images of said objects on said indicator.

19. In distance measuring radio apparatus having a transmitter for transmitting radio waves and a receiver for receiving said waves after reflection and wherein a characteristic of the received reflected radio waves varies relative to the same characteristic of the transmitted radio waves as a function of the distance to said reflecting object, the combination comprising an indicator having a screen, means responsive to said distance controlled characteristic for producing a stereoscopic indication on said screen having an apparent depth relative thereto dependent upon the distance to said reflecting object.

20. In apparatus adapted to indicate the time interval between signals of substantially the same periodicity, a reference source of periodic signals, a second source of signals of substantially the same periodicity as said reference source but having an unknown time delay with respect thereto, indicating means having a screen and supplied by said second source for forming a dual image from said signals of unknown time delay, time sweep means controlled by said reference source for laterally separating respective portions of said image, and stereoscopic viewing means for determining said time interval by revealing the apparent depth of said image relative to said indicating screen.

21. A radio system comprising a receiver of radio signals, a source of timing signals, indicating means supplied by said receiver for forming a dual image from said radio signals, time sweep means synchronized by said timing signals for laterally separating respective portions of said image an extent dependent upon the interval between said timing signals and said radio signals, and means for viewing said separated portions of said image with the separate eyes of an observer.

22. In apparatus adapted to indicate the time interval between recurrent signals, a source of recurrent reference signals, a second source of recurrent signals having an unknown time delay with respect to said reference signals, indicating means having a screen and supplied by said signals of unknown time delay for forming a dual image therefrom, time sweep means synchronized by said reference signals for laterally separating respective portions of said image an extent dependent upon the time delay between said reference signals and said signals of unknown time delay, and stereoscopic viewing means for determining said time delay by revealing the apparent depth of said image relative to said indicating screen.

23. The method of visually reproducing intelligence, which includes the steps of rendering doubly visible in rapid alternation regularly repeated versions of corresponding signals derived from a common electronic source, said two renditions being spaced one from the other, in uniplanar space horizontally displacing the received signals in one of said renditions with respect to the other, and stereoscopically viewing said two renditions.

WALDEMAR A. AYRES.

REFERENCES CITED

The following references are of record in the file of this patent:

UNITED STATES PATENTS

| Number | Name | Date |
|---|---|---|
| 934,916 | Van Hofe | Sept. 21, 1909 |
| 1,514,948 | Barr et al. | Nov. 11, 1924 |
| 1,887,708 | Cameron | Nov. 15, 1932 |
| 2,107,464 | Zworykin | Feb. 8, 1938 |
| 2,231,929 | Lyman | Feb. 18, 1941 |
| 2,301,254 | Carnahan | Nov. 10, 1942 |
| 2,312,203 | Wallace | Feb. 23, 1943 |
| 2,417,446 | Reynolds | Mar. 18, 1947 |

FOREIGN PATENTS

| Number | Country | Date |
|---|---|---|
| 520,778 | Great Britain | May 3, 1940 |

Certificate of Correction

Patent No. 2,514,828　　　　　　　　　　　　　　　　　　　July 11, 1950

WALDEMAR A. AYRES

It is hereby certified that error appears in the printed specification of the above numbered patent requiring correction as follows:

Column 12, line 71, after the word "energy" insert *scanning*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*